May 27, 1941. W. E. KIDDER 2,243,345
SLED
Filed Aug. 12, 1940 2 Sheets-Sheet 2
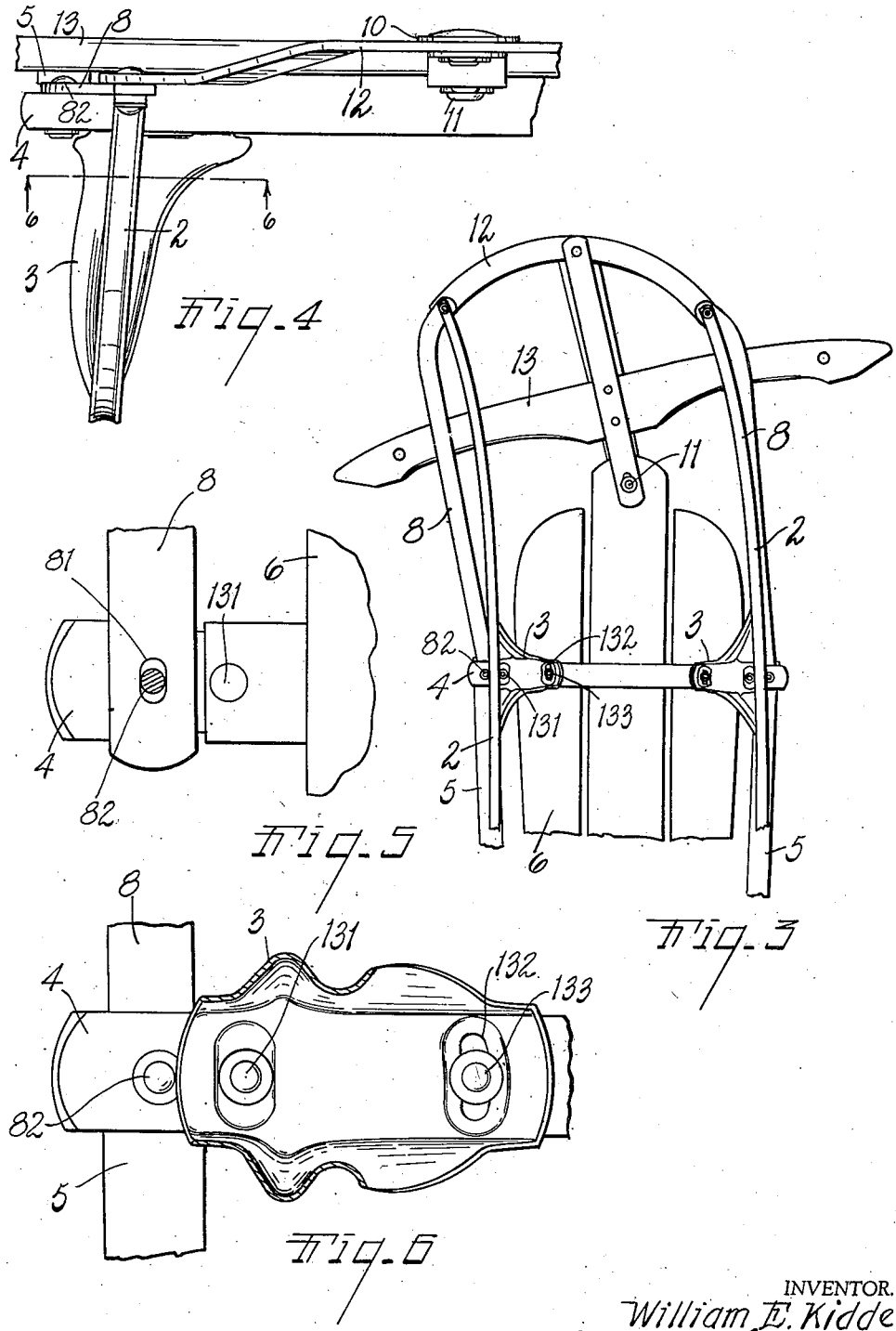

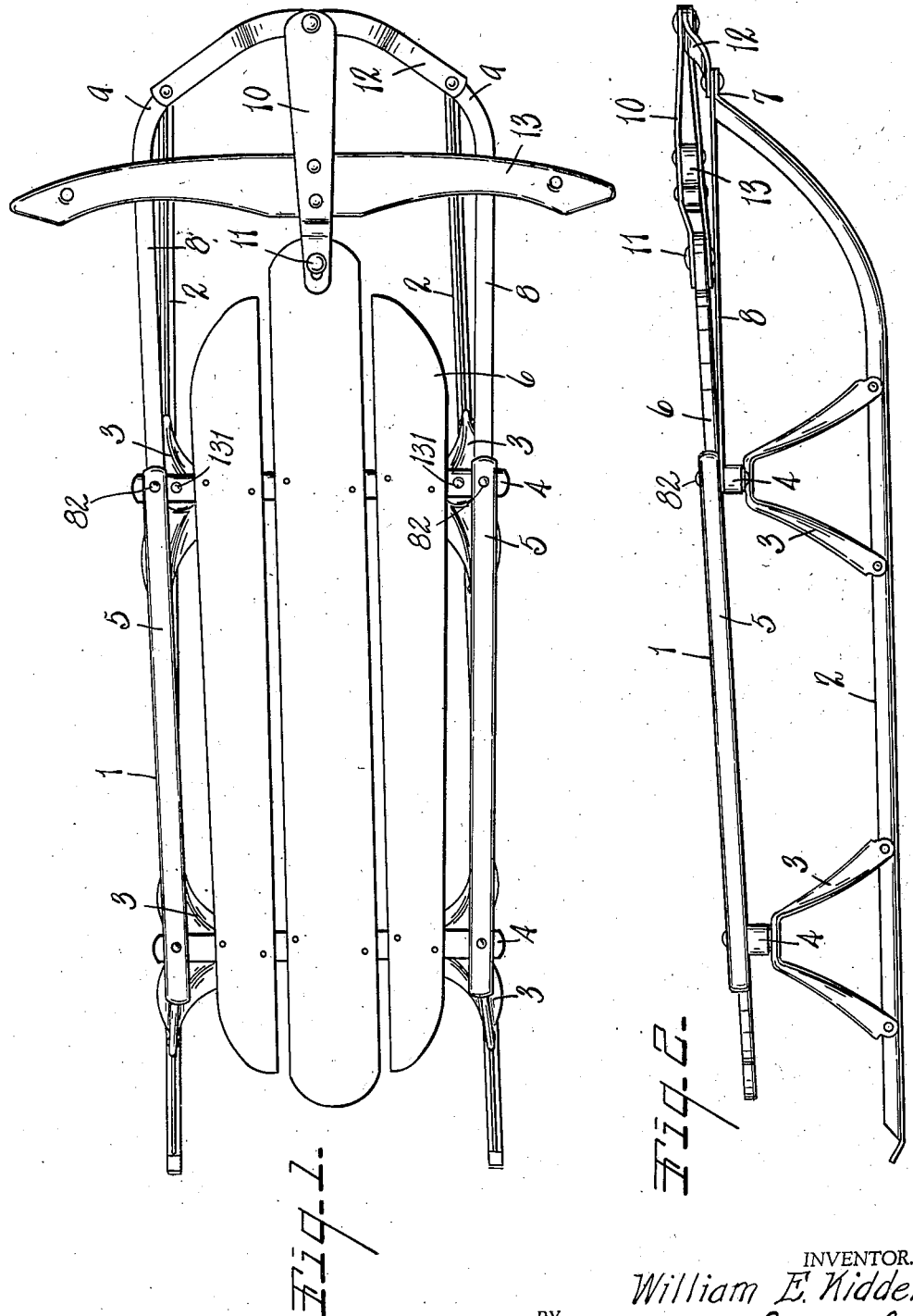

Patented May 27, 1941

2,243,345

UNITED STATES PATENT OFFICE 2,243,345

SLED

William E. Kidder, Kalamazoo, Mich., assignor to Kalamazoo Sled Company, Kalamazoo, Mich.

Application August 12, 1940, Serial No. 352,267

6 Claims. (Cl. 280—22)

This invention relates to improvements in sleds.

The main objects of my invention are:

First, to provide a sled having novel means for strengthening and rigidifying the same while at the same time preserving an attractive, racy appearance and adding materially to its steering ability.

Second, to provide a sled of the type described having means for compensating for a difference in angular relation between certain of the parts thereof, at the same time adding to the rigidity of the sled adjacent those parts.

Third, to provide a sled having a front structure which is effective as a bumper or guard.

Further objects relating to details and economies of my invention will appear from the description to follow. The invention is defined in the claims.

A structure embodying the features of my invention is illustrated in the accompanying drawings, wherein:

Fig. 1 is a top plan view illustrating a sled incorporating the provisions of my invention.

Fig. 2 is a view in side elevation further illustrating the invention.

Fig. 3 is a fragmentary bottom plan view of the sled of my invention illustrating the extreme flexibility of the runners obtained by the structure of my invention.

Fig. 4 is a fragmentary view in front elevation further illustrating details of the structure.

Fig. 5 is an enlarged fragmentary detail view illustrating the method of connection of certain of the sled parts.

Fig. 6 is an enlarged fragmentary view in section on line 6—6 of Fig. 4.

Referring to the drawings, reference numeral 1 indicates a sled in accordance with my invention having runners 2 connected by front and rear pairs of knees 3 to the transverse benches 4 which support the raves 5 and the top boards 6. Knees 3 are of different heights so that the top boards and raves are supported at a rearward and downward inclination, as clearly illustrated in Fig. 2. The runners 2 curve upwardly at the front of the sled terminating at 7 at approximately the same or only slightly higher elevation than the top of the front bench 4. The metal links 8 on either side of the sled are secured between the raves and front bench by means of an elongated slot 81 in the links receiving a fixed rivet 82 connecting the raves and front bench. The links extend forwardly to the points 7 where they are secured to the runners and front cross bar 12 by a rivet connection permitting relative pivotal movement of the links and cross bar. As illustrated in Fig. 1, the links are alined with the raves 5 which are inclined centrally and rearwardly to give the sled a rearwardly tapered, streamlined appearance. Inasmuch as the runners are parallel, the links are curved inwardly at 9 to the point of securement to the runners.

The center board has a steering lever 10 consisting of a pair of vertically superposed straps pivoted thereto by an elongated slot and rivet connection 11 and is likewise pivoted at its forward end to the cross bar 12. This cross bar has a curved outline which merges into the curve of the link portions, as clearly illustrated in Fig. 1, to thereby impart a continuous curvature to the front of the sled which is very strong and attractive in appearance. The links 8 are secured between the ends of the cross bar and the runner extremities as illustrated in Figs. 2 and 3, there being considerable freedom of pivoting movement at both ends of the links to facilitate steering. The steering lever has a transverse steering bar 13 secured thereto.

Referring to Figs. 3 and 6, it will be noted that the knees 3 are pivoted, though laterally restrained, on the lower side of the front bench by means of a round hole receiving a rivet-like pivoting member 131. Inwardly of this pivot point, the knees are guided for pivotal movement thereabout by means of an arcuate slot 132 in the knee receiving a further rivet 133. Thus, when the steering bar 13 is actuated, as illustrated in Fig. 3, the knees pivot substantially in response thereto, thus allowing the runners 2 to assume a bend throughout a substantial length thereof and well in the direction of the second or rear pair of knees. Links 8 have a free pivotal and sliding movement with relation to their points of securement to the front bench in this steering operation and the steering lever 10 also pivots and shifts freely, so that a very effective and flexible steering arrangement results.

Because of the substantial downward and rearward inclination of the top boards and raves 6 and a lesser or zero inclination of the links 9, there exists a difference in angularity between the steering levers and links which is desirable because it positions the steering bar 13 connected to the steering lever above the links 8, so that there is no necessity to make special provisions to eliminate friction therebetween. Ample movement of the steering bar and resilient maximum steering ability are thus made possible without binding effects and without requiring unusual effort.

For connecting the front of the steering lever to the cross bar, the latter is substantially curved or arched upwardly at the center thereof. See Figs. 2 and 3. The cross bar is greatly strengthened against downward distortion or bending by this upward arch and much more effectively supports the steering lever. Moreover, the gradual front-to-rear incline of the sled top from the cross bar is maintained, which adds substantially to the appearance of the sled. Still further, the upward arch positions the cross bar at the point of termination of the lowermost steering lever strap for pivotal connection of the bar and strap without bending the latter.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a sled having the top boards and raves rearwardly and downwardly inclined relative to the runners thereof, the raves being rearwardly and centrally convergent and said boards and raves being supported by benches extending transversely of and secured to knees on the sled runners, a pair of metal links having a longitudinally slidable and pivotal connection on opposite sides of the sled between the raves and front benches, said links being alined with the raves and being disposed substantially horizontal and parallel to the runners, a cross bar extending between the forward upturned ends of the runners and connected to the runners and forward ends of the links, said cross bar being upwardly arched at an intermediate portion thereof, and a steering lever pivotally and slidably connected to one of said top boards and pivotally connected to the cross bar at said intermediate arched portion, the forward pair of knees having means connecting the same to the forward bench for limited pivotal movement of the knees when the runners are flexed, the upward curvature of said cross bar bracing the same vertically and enabling the gradual upward and forward line of inclination of the raves, top boards, and steering lever to be maintained and thus allowing an ample movement of the steering bar without binding effect against said links.

2. In a sled having the top boards and raves rearwardly and downwardly inclined relative to the runners thereof, the raves being rearwardly and centrally convergent and said boards and raves being supported by benches extending transversely of and secured to knees on the sled runners, a pair of metal links having a pivotal connection on opposite sides of the sled to the front benches, said links being alined with the raves and being disposed substantially horizontal and parallel to the runners, a cross bar extending between the forward upturned ends of the runners and connected to the runners and forward ends of the links, said cross bar being upwardly arched at an intermediate portion thereof, and a steering lever pivotally connected to one of said top boards and to the cross bar at said intermediate arched portion, the forward pair of knees having means connecting the same to the forward bench for limited pivotal movement of the knees when the runners are flexed, the upward curvature of said cross bar bracing the same vertically and enabling the gradual upward and forward line of inclination of the raves, top boards, and steering lever to be maintained and thus allowing an ample movement of the steering bar without binding effect against said links.

3. In a sled having the top boards and raves rearwardly and downwardly inclined relative to the runners thereof, the raves being rearwardly and centrally convergent and said boards and raves being supported by benches extending transversely of and secured to knees on the sled runners, a pair of metal links having a pivotal connection on opposite sides of the sled to the front benches, said links being alined with the raves and being disposed substantially horizontal and parallel to the runners, a cross bar extending between the forward upturned ends of the runners and connected to the runners and forward ends of the links, said cross bar being upwardly arched at an intermediate portion thereof, and a steering lever pivotally connected to one of said top boards and to the cross bar at said intermediate arched portion, the upward curvature of said cross bar bracing the same vertically and enabling the gradual upward and forward line of inclination of the raves, top boards, and steering lever to be maintained and thus allowing an ample movement of the stteering lever without binding effect against said links.

4. In a sled having the top boards and raves rearwardly and downwardly inclined relative to the runners thereof, said boards and raves being supported by benches extending transversely of and secured to knees on the sled runners, a pair of metal links pivotally and slidably connected on opposite sides of the sled to the raves and front benches, and being disposed substantially horizontal and parallel to the runners, a cross bar extending between the forward upturned ends of the runners and connected to the runners and forward ends of the links, said cross bar being upwardly arched at an intermediate portion thereof, and a steering lever pivoted on one of said top boards and the cross bar at said intermediate arched portion, the upward curvature of said cross bar bracing the same vertically and enabling the gradual upward and forward line of inclination of the raves, top boards, and steering lever to be maintained.

5. In a sled having the top boards and raves rearwardly and downwardly inclined relative to the runners thereof, said boards and raves being supported by benches extending transversely of and secured to knees on the sled runners, a pair of metal links pivotally connected on opposite sides of the sled to the raves and front benches, and being disposed substantially horizontal and parallel to the runners, a cross bar extending between the forward upturned ends of the runners and connected to the runners and forward ends of the links, said cross bar being upwardly arched at an intermediate portion thereof, and a steering lever pivoted on one of said top boards and the cross bar at said intermediate arched portion, the upward curvature of said cross bar bracing the same vertically and enabling the gradual upward and forward line of inclination of the raves, top boards, and steering lever to be maintained.

6. A sled having top boards, runners and pairs of front and rear knees connecting the runners respectively to transverse front and rear benches, said front knees being of greater length than the rear knees and the top boards being inclined rearwardly and downwardly, means for connecting said front knees to said front bench, comprising a fixed pivot pin on the bench for each knee and a further guide pin for each knee disposed on the bench inwardly of the pivot pin, said knees each having a pivot connection to the pivot pin and an elongated slot extending in the direction of the length of the sled to guidingly receive said guide pin whereby the runners are flexed to distribute the flexing action throughout substantially the entire runner length, forwardly extending links pivotally and slidably connected at one end to said front bench, a cross bar pivotally connected to the opposite ends of the links and having an upwardly curved intermediate portion, a steering lever pivotally connected to said cross bar at said intermediate portion thereof, said lever being pivotally and slidably connected to a top board of the sled and extending parallel with the top boards to said portion, and a steering bar secured to said lever for swinging the links and cross bar to flex said runners, the forward extremities of the runners being likewise pivoted to the links and cross bar at the pivot points thereof.

WILLIAM E. KIDDER.